United States Patent [19]

Nylund

[11] Patent Number: 5,080,858
[45] Date of Patent: Jan. 14, 1992

[54] FUEL ASSEMBLY FOR A BOILING REACTOR

[75] Inventor: Olov Nylund, Västeras, Sweden

[73] Assignee: ABB Atom AB, Västerås, Sweden

[21] Appl. No.: 606,456

[22] Filed: Oct. 31, 1990

[30] Foreign Application Data

Nov. 14, 1989 [SE] Sweden .................... 8903818

[51] Int. Cl.$^5$ .................................. G21C 3/32
[52] U.S. Cl. ................... 376/443; 376/439; 376/444; 376/448
[58] Field of Search ............ 376/443, 439, 444, 448

[56] References Cited

U.S. PATENT DOCUMENTS

| | | | |
|---|---|---|---|
| 3,809,609 | 5/1974 | Krawiec et al. | 376/439 |
| 4,388,269 | 6/1983 | Larson | 376/439 |
| 4,765,949 | 8/1988 | Denizou et al. | 376/443 |
| 4,775,509 | 10/1988 | Noailly et al. | 376/442 |
| 4,933,138 | 6/1990 | Mouesca et al. | 376/442 |

Primary Examiner—Donald P. Walsh
Assistant Examiner—Meena Chelliah
Attorney, Agent, or Firm—Watson, Cole, Grindle & Watson

[57] ABSTRACT

The invention relates to a fuel assembly in the form of an elongated channel having several corners. The channel is connected to a coolant intended to flow through the channel. A bundle of similarly elongated fuel rods, retained by a plurality of spacers (8), is arranged in the channel. The spacer (8) comprises a number of cells surrounded by an outer frame which is formed from a band placed on edge. According to the invention, the band is extended on the upstream side of the spacer (8) by a skirt (12), in which openings (13) are provided. In certain of these openings deflection fins (14) have been arranged in order to deflect coolant, flowing along the assembly wall (6), in a direction towards the center of the respective spacer (8).

8 Claims, 3 Drawing Sheets

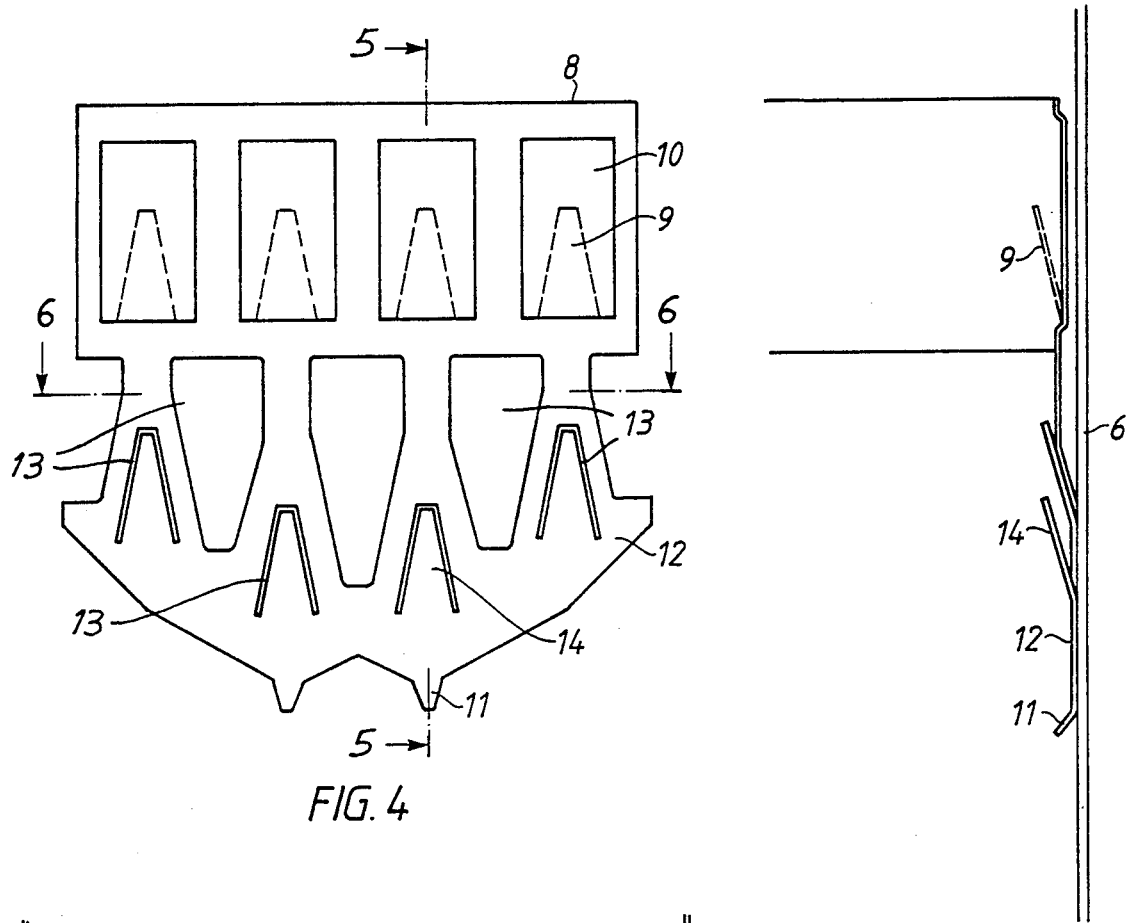
FIG. 4
FIG. 5
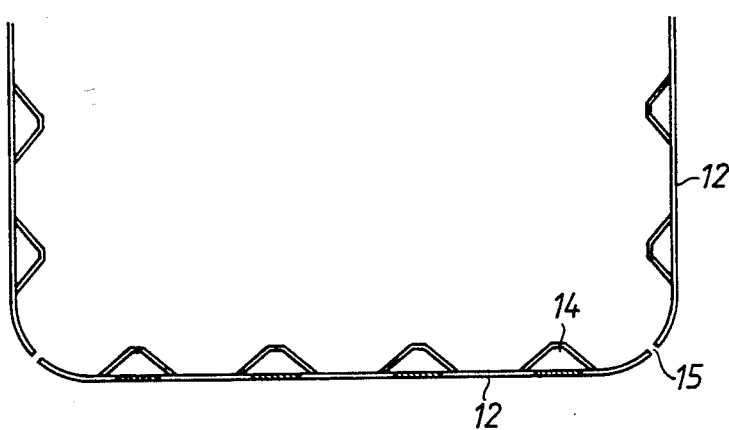
FIG. 6

FUEL ASSEMBLY FOR A BOILING REACTOR

The present invention relates to a fuel assembly for a boiling reactor. The fuel assembly comprises a bundle of elongated fuel rods retained by a number of so-called spacers placed with a certain distance between each other along the bundle. A coolant, for example water, is adapted to flow from below and upwards through the fuel assembly which normally is arranged vertically and, upon a nuclear reaction, to cool the fuel rods arranged in the fuel assembly. The object of the invention is to increase the efficiency of this cooling of the fuel rods.

In a boiling type nuclear reactor the steam formation in the fuel assembly increases more and more towards the upper part of the assembly, as is clear from FIG. 1 which shows, in rough outline, a cross section of part of a fuel assembly. In FIG. 1, 1 designates a fuel rod and 2 spaces between the rods. This space 2 is in the lower part of the fuel assembly (corresponding to the lower part of the core of the reactor), filled with coolant, in this case water. Further up in the fuel assembly, steam bubbles 3 are formed in the water which, still further up, is transformed into water steam in the region 4. As long as so-called dry out does not take place, however, there is always a film 5 of the cooling water on the fuel rods. It is important that this film 5 is maintained at all points of the rods 1. If at some point it disappears by dry out, serious damage at this point of the fuel rod 1 will rapidly arise.

In FIG. 1, 6 designates the wall of the fuel assembly. Also this is normally coated with a water film 5. However, this film 5 is not entirely necessary since the wall 6 of the assembly is considerably more insensitive to superheating compared with the fuel rods. This fact has been observed and attempts have been made to make use of it in some known designs, as, for example, in U.S. Pat. No. 4,749,543, column 8 and FIG. 9. In these designs, the cooling water flowing along the wall 6 of the fuel assembly is diverted towards the centre of the bundle by means of elevations on the wall 6 or recesses in the same. Also fins on the downstream side of the spacers are used to achieve a diversion or deflection of the cooling water. All these embodiments have certain drawbacks. Thus, for example, the elevations may increase the pressure drop in the cooling water and thus reduce the cooling effect whereas recesses in the wall entail certain difficulties from the point of view of manufacturing technique. Further, a deflection of the cooling water flowing along the assembly wall 6 should take place as early as possible in relation to each separate spacer and, in any case, preferably not immediately after the same viewed in the direction of flow. This is due to the fact that dry outs normally occur immediately upstream of a spacer or possibly in the same.

The present invention relates to a device for achieving, in a known spacer, the desired deflection of the coolant in a simple manner. The spacer, which in this case consists of a number of cells surrounded by an outer frame formed from a metal band placed on edge, is provided according to the invention with a skirt. This skirt extends the mentioned band in the upstream direction of the flowing coolant. Openings have been arranged in the skirt and in some these openings deflection fins have been inserted in order to deflect the coolant, flowing along the assembly wall, in a direction towards the centre of each respective spacer.

By the present device improved cooling is obtained immediately below the respective spacer where dry out normally occurs. The extension or skirt may be made as part of the ordinary spacer frame or as a separate part connected thereto. In the latter case the skirt may be made of Zircaloy for achieving reduced neutron absorption.

BRIEF DESCRIPTION OF THE DRAWINGS

The invention will be best understood with reference to the accompanying FIGS. 1-9. FIG. 4 schematically shows one of the spacers, shown in FIG. 2, seen from the side but provided with a skirt according to the invention. FIGS. 5 and 6 show sections along line 5—5 and line 6—6, respectively, in FIG. 4.

In FIG. 2, 7 designates the fuel assembly in the form of an elongated multi-corner channel with a wall 6. The fuel assembly 7 accomodates spacers 8 of a known type. The spacers 8 are here provided with windows 10 but may also be without such windows. FIG. 3 shows one of the same spacers 8 seen from above.

FIG. 4 schematically shows a spacer 8 provided with a skirt 12 which extends the frame of the spacer 8 in a direction towards the direction of flow of the coolant. The skirt 12 is provided with windows 13 to reduce the amount of material and with deflection fins 14. If the spacer 8 is provided with windows 10, deflection fins 9 may also be arranged in these windows. As mentioned, FIGS. 5 and 6 show sections of FIG. 4. From FIG. 6 it is clear that the side pieces of the skirt may be made divided at 15 and be made resilient so that, when the fuel rod bundle is inserted into the fuel assembly 7, the side pieces of the skirt make good contact with the assembly wall 6, thus obtaining centering of the spacer 8. The invention functions in such a way that the lower edge of the skirt 12 scrapes cooling water from the assembly wall 6 and its fins contribute to increased turbulence and to conduct the cooling water towards the centre of the spacer 8. The lower edge of the skirt 12 is provided with guide studs 11 to facilitate the insertion of the fuel rod bundle into the fuel assembly. In addition, the lower edge has been given a convex configuration, also this to facilitate the insertion of the bundle into the fuel assembly.

FIGS. 7-9 show a similar embodiment but with the skirt 12 being detachable. As previously, the skirt 12 is provided with deflection fins 14. At its top, the skirt 12 has a number of tape-formed insertion members 16 which may be inserted into the spacer 8 for fixing the skirt 12 to the frame of the spacer 8. At the top the insertion members 16 are bent inwards, at 18, to facilitate guiding the bundle in the fuel assembly. At the guide studs 11 the insertion members 16 have been provided with holes 19 to lock the members 16 and hence the skirt 12 in the spacer 8. The lower edge of the skirt 12 has also been designed arrow-shaped to facilitate the insertion of the bundle into the fuel assembly 7. For this purpose also the tips 17 are inwardly-bent. The skirt 12 may be designed in separate pieces-one for each side with openings at 15 and resilient towards the wall of the fuel assembly.

Figure 1:
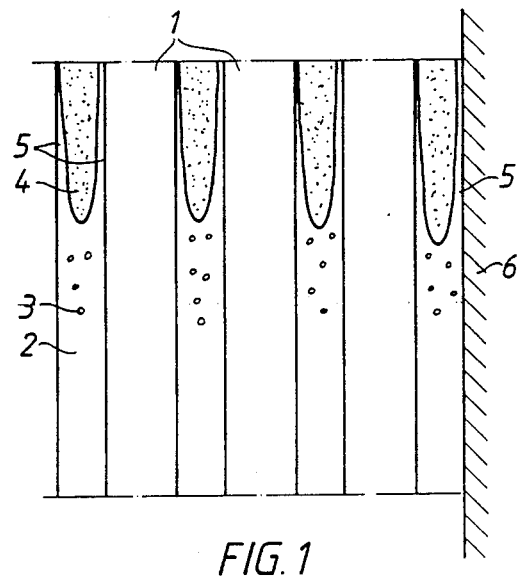
FIG. 1 shows a cross section of part of a fuel assembly.
Figure 3:
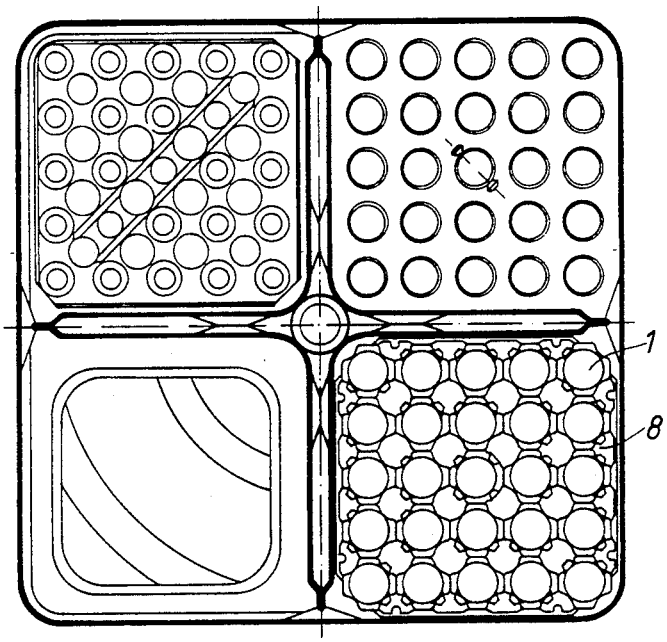
FIG. 2 shows a fuel assembly for four separate bundles of fuel rods and FIG. 3 shows a cross section through the same fuel assembly.
Figure 2:
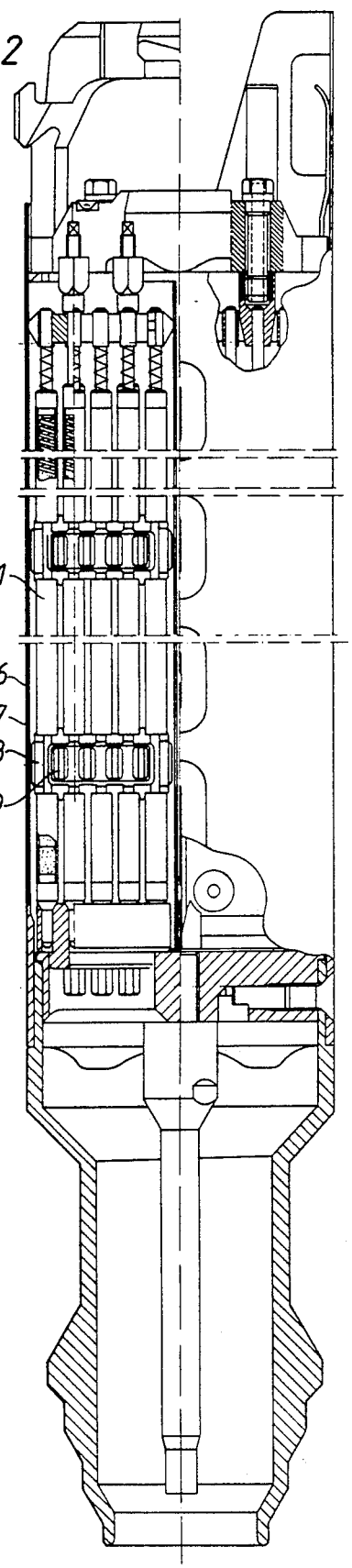
Figure 7:
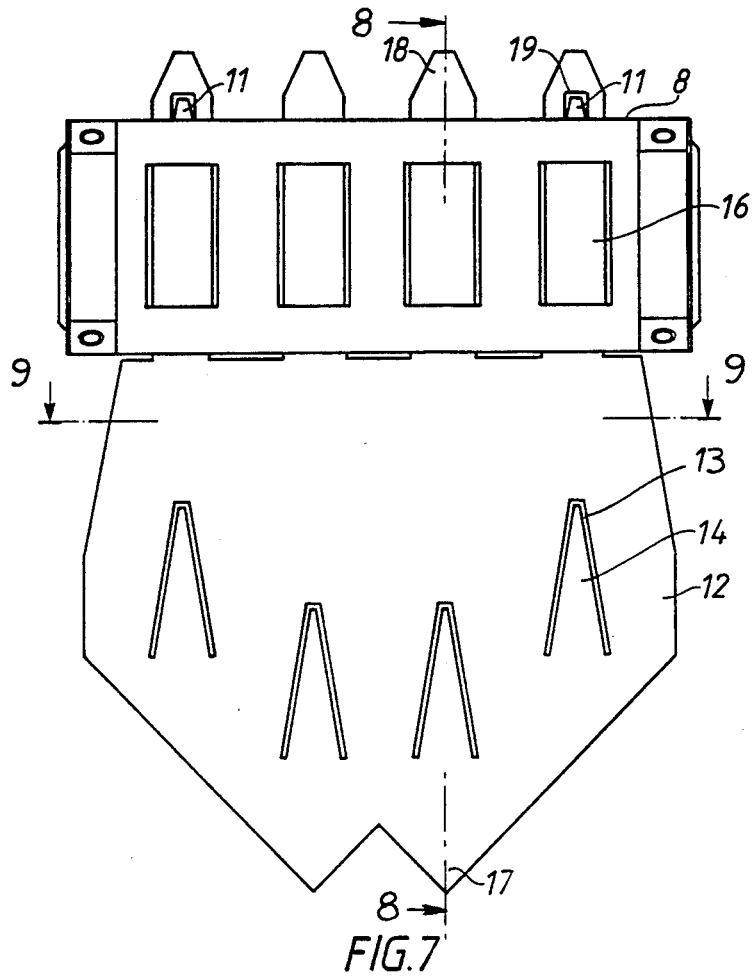
FIGS. 7-9 show an additional embodiment with a detachable skirt, FIG. 8 showing a view along line 8—8 in FIG. 7 and FIG. 9 showing a view along line 9—9 in FIG. 7.
Figure 8:
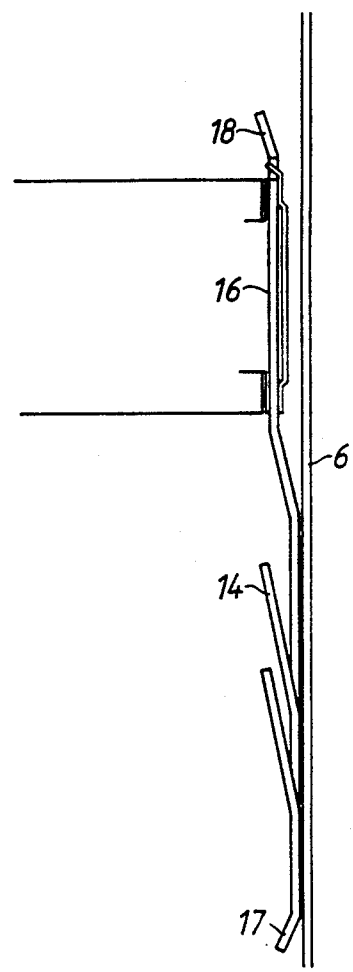
Figure 9:
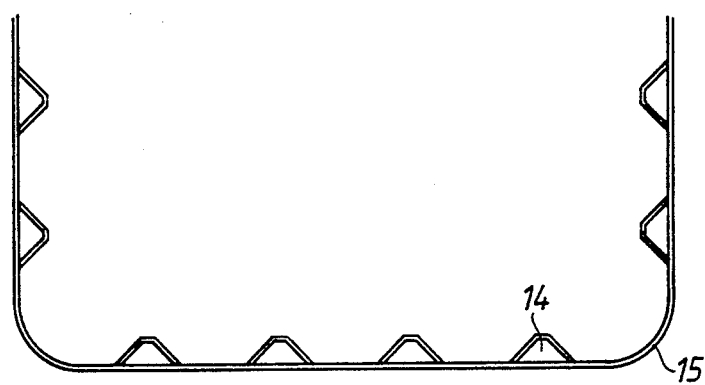

Another possibility is that the skirt is designed as an undivided closed sleeve in both of the above-mentioned embodiments. A certain distance betweeen the assembly wall and the skirt 12 must then be maintained. This results in a somewhat less efficient device from the point of view of cooling. On the other hand, the risk of vibrations is then reduced.

The design with a detachable skirt means that the skirt may be made of a material different from that of the spacer 8 itself, which may be an advantage. The skirt 12 may, for example, be made of Zircaloy, which has a lower neutron absorption than Inconel, from which the spacer 8 is normally made and which has a higher neutron absorption.

I claim:

1. A fuel assembly in the form of an elongated multi-corner channel having a wall, said channel being connected to a coolant intended to traverse the channel, a bundle of similarly elongated fuel rods arranged in the channel and retained by a plurality of spacers placed along the bundle and comprising a number of cells surrounded by an outer frame which is formed of a band standing on edge, wherein said band on an upstream side of the spacer is extended by a skirt in which openings are arranged, said skirt making close contact with said wall, deflection fins being arranged in certain openings to deflect a coolant flowing along said wall in a direction towards the center of the respective spacer.

2. A fuel assembly according to claim 1, wherein the skirt is arranged open in the above-mentioned corner and makes contact in a resilient manner with said wall.

3. A fuel assembly according to claim 1, wherein the spacer frame is provided with windows in which deflection fins are arranged in order to strengthen the deflecting effect of the fins provided in the skirt.

4. A fuel assembly according to claim 1, wherein each side piece of the skirt, corresponding to one side of the multi-corner channel, has an edge facing the direction of flow, which edge in a direction against the flow has been give a substantially arrow- or convex-like shape.

5. A fuel assembly according to claim 1, wherein each side piece of the skirt is made in a separate piece and provided on the downstream side with members to be connected with the frame of the spacer.

6. A fuel assembly according to claim 5, wherein the skirt is made of Zircaloy.

7. A fuel assembly according to claim 5, wherein the side pieces of the skirt are connected to each other at the corners so that the skirt forms a sleeve.

8. A fuel assembly which comprises a wall that defines an elongated, multi-cornered channel through which coolant can flow from an upstream end to a downstream end, a bundle of elongated fuel rods positioned in said channel, and a plurality of spacer means positioned at separated locations along said bundle of fuel rods, each of said spacer means comprising an elongated outer band, means defining a plurality of cells within the outer band and a center line, and a skirt which extends from said outer band toward said upstream end of said channel and in contact with said wall, said skirt having a plurality of openings therein and including fins located upstream of some of said openings, said fins extending inwardly of said wall and in said downstream direction so as to deflect coolant flowing in said downstream direction inwardly of said wall and towards said center line.

* * * * *